Feb. 21, 1967  J. DUMPIS  3,305,281
IDLER ARM REPAIR KIT
Filed July 19, 1963  3 Sheets-Sheet 1
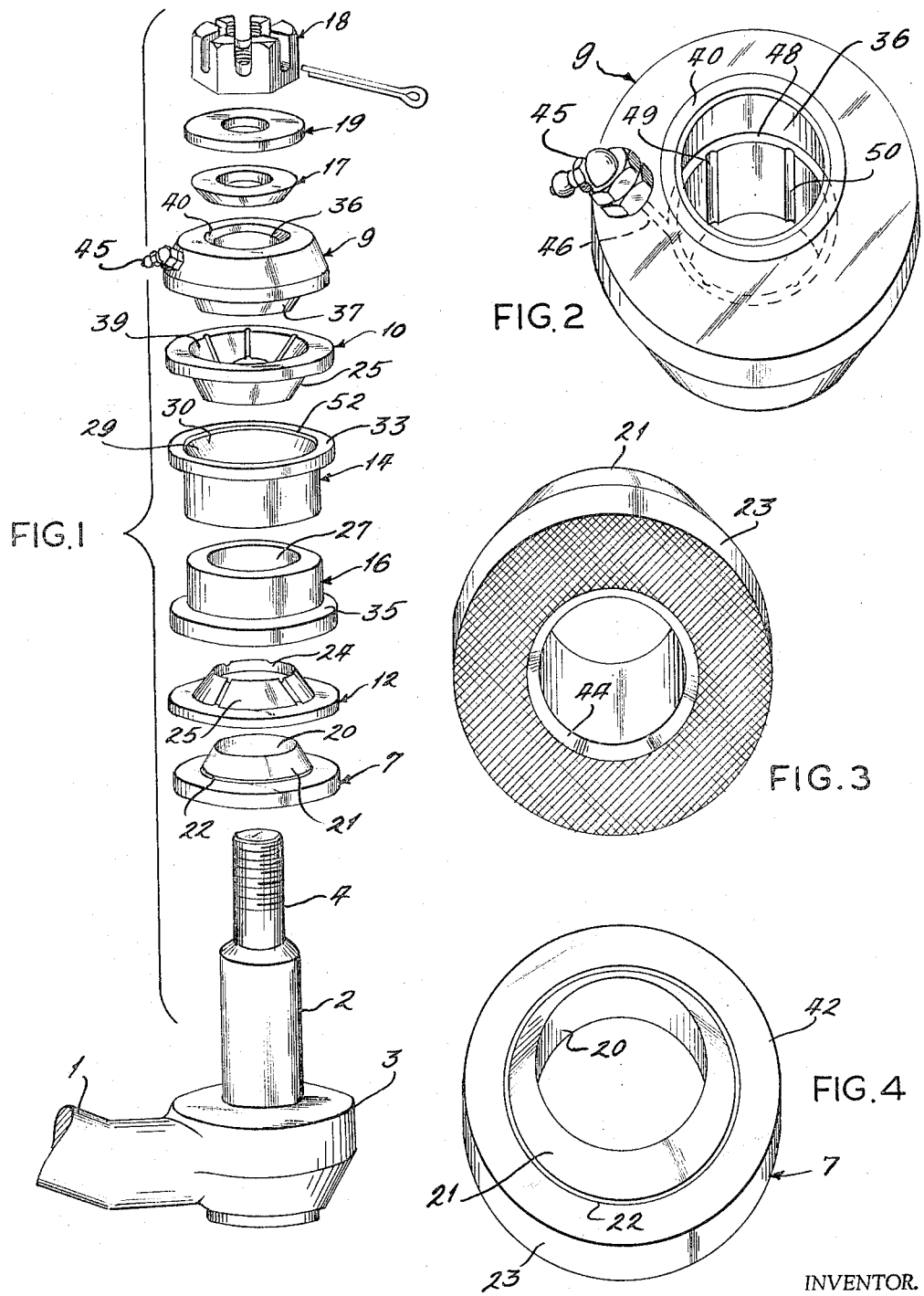
INVENTOR.
JANIS DUMPIS
BY
Laurence M. Goodridge
ATTORNEY.

United States Patent Office 3,305,281
Patented Feb. 21, 1967

3,305,281
IDLER ARM REPAIR KIT
Janis Dumpis, St. Ann, Mo., assignor to Champ-Items, Inc., St. Louis, Mo., a coporation of Missouri
Filed July 19, 1963, Ser. No. 296,191
5 Claims. (Cl. 308—36.1)

This invention relates to bearings and more specifically to an improvement in a fully sealed bearing assembly intended to serve as a pivotal joint between links in an oscillating linkage. This bearing assembly is furnished in kit form with parts which fit and replace the standard bearing often used in automotive steering linkages, but a bearing kit of this kind finds many other analogous uses, both automotive and otherwise.

In the exemplary usage mentioned, there are a plurality of links which can be pivotally connected by this improved form of bearing with bearing parts of this replacement kit. A typical instance would be on opposite ends of an idler arm used in the steering linkage, which arm forms an oscillating support for one end of the so-called drag link in the steering linkage. The opposite end of the drag link is usually oscillated by a pivoted connection to the end of a swinging crank arm positioned by the gearing on the end of the steering column. Both the crank arm and the idler arm are supported on the automobile chassis, and the bearings at the various pivots are, consequently, exposed to road dirt and water. This makes a sealed type of bearing extremely desirable. A steering linkage also includes individual tie bars having a ball joint type of connection at one end to spaced points along the drag link and a similar type connection with steering arms on the stub axles which support each front wheel. The entire steering linkage is subject to heavy loads and road shock, and, consequently, the type of bearing used at the pivot supports of the idler arm and linkage must be capable of severe duty. Any bearing looseness, or undue friction, either initially, or after subsequent wear, or shock damage, is reflected in the vehicle steering, and replacement of the idler arm unit, or its bearings, becomes desirable. This improved fully sealed bearing assembly is supplied in kit form as a replacement of the original bearings at opposite ends of the idler arm unit. Another use would be a replacement idler arm unit including the kit parts assembled to form sealed bearing assemblies, but, whether supplied in kit form or in a unit replacement, the bearing obviously acts as a pivot for oscillating links used in vehicles.

Accordingly, it is an object of this invention to provide an improved pivot bearing assembly of the sealed type applicable to a joint for an oscillating link.

A more specific object of the present invention is to provide a kit for replacing the bearings at opposite ends of an idler arm in a steering linkage for a vehicle.

A further specific object of the present invention is to provide an idler arm with improved pivot bearing assemblies of the sealed type resistant to shock, high thrust and radial loading.

Another object of this invention is an improved bearing assembly which will retain lubrication under high loading and shock.

A further object of this invention is a bearing assembly which has no metal to metal contact in the bearings.

A further object of this invention is a bearing assembly adapted for periodic lubrication so as to improve durability of non-metallic bearing inserts.

The bearing, according to this invention, is a combined radial and thrust bearing of the sealed type which has no metal to metal contact in the bearings. One example would be a bearing kit for replacing the original bearings at opposite ends of a steering idler arm which have become loose and worn. The idler arm, to which the bearing is applied, has an arm with upright spindles at opposite ends arranged in spaced parallel relation. The bearings journal the spindles in the hollow hubs of a bracket attached in a fixed position on the chassis of the vehicle and a hub on the end of a drag link of the steering linkage, respectively. On each spindle are mounted two oppositely facing tapered bearings which will resist both radial and thrust loading in a manner similar to a pair of tapered roller bearings often used for this purpose. The tapered bearings are preferably the same size and kind. Both have a pair of bushings frictionally held on the spindle and a pair of bushings tight in the hub. Mating male and female conical races on adjacent faces of the bushings are spaced by a conical bearing of plastic, preferably nylon. Each conical bearing has a radial sealing lip compressed between radial faces on the bushings surrounding the races. On the ends of the spindle are threads to receive nuts to clamp the parts of the bearing together for relative rotation and tight enough so as to seal the space between bushings. Beneath the nuts are tapered seals of nylon to prevent leakage between the spindle and the end bushings thereon. Such a seal may also be used on the opposite end of the spindle, if desired, although this is not usually required. Internally of the bushings are lubricant passages, and a grease fitting is provided in one end, or the other, threaded into a bushing, to supply these internal passages.

Other objects and advantages of this invention will appear from the following detailed description which is in such clear, concise and exact terms as will enable any persons skilled in the art to make and use the same when taken in conjunction with the accompanying drawings, forming a part thereof, and in which:

FIG. 1 is an exploded view in perspective showing a spindle for an idler arm and the several parts of the kit which fit on the spindle of the idler arm;

FIG. 2 is a perspective view of the upper side of the top male race of the kit;

FIG. 3 is a bottom perspective view of the lower side of the bottom male race in the kit;

FIG. 4 is a perspective view of the opposite side of either of the male races used in the kit;

Figure 6:
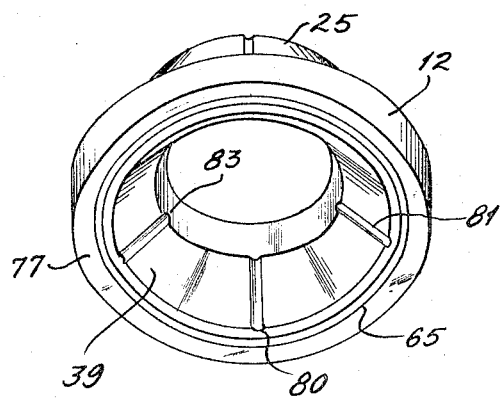
FIG. 6 is a perspective view showing one side of either cone bearing used in the kit.
Figure 7:
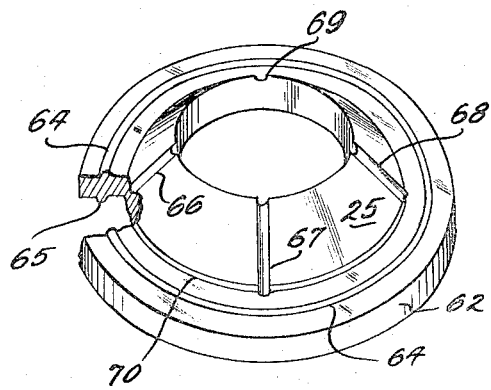
FIG. 7 is a perspective view showing the opposite side of either cone bearing used in the kit.

This description will be confined to the specific elements used in one form of kit for replacing a spindle bearing on an idler arm and its manner of installation, it being understood that the parts described and illustrated, when installed, form a pair of spaced tapered antifriction bearings for an oscillating joint connection subject to both radial and axial thrust. Each bearing is preferably of nylon, or other elastomeric, non-metallic material of which there are many, and is imminently suited to damp impact loading, and in this way isolate to some extent road shock and engine vibration from transmission through the links of the steering. The kit parts are designed to form tapered combined radial and thrust bearings in which there is no metal to metal bearing contact. If thrust is unidirectional in a particular installation, then the single bearing could be made to perform as well as two or more. Although only one embodiment is shown, the number of parts and detail design of each part is regarded as ancillary and variable in number and detail to suit the requirements of a particular installation. FIG. 1, therefore, shows a kit containing a certain number of parts of particular design to meet the requirements of one particular installation. This installation is on a spindle 2 at one end of an idler arm 1, and, as will be later pointed out, form a suitable combined radial and thrust bearing of the tapered type for journaling the spindle for oscillation in the hub of a bracket or link. The lower portion of the spindle 2 has a flat collar 3 and the upper end of the spindle 2 is tapered and threaded as at 4.

The elements of this particular kit are shown separated in FIG. 1 in order to explain the manner of assembly on the spindle 2. This particular kit contains a bottom male race 7, a top male race 9, a pair of idential cone bearings of nylon 10 and 12, a pair of substantially identical female race members 14 and 16, at least one ring seal, such as 17, and nut and washer 18 and 19. The bottom male race 7 is apertured at 20 to have a relatively snug fit with the spindle 2 and is frictionally held with its lower knurled surface in contact with collar 3. The bottom male race has a conical face 21 which in turn mates with an internal conical face on the bottom of the cone bearing 12. Central aperture 24 in the cone bearing 12 surrounds the spindle 2 in slightly spaced relation thereto. A bearing face 25 of cone shape mates with a similar face within the female race member 16 which is apertured at 27 to slidably receive the spindle 2 and seat upon the cone bearing 12. Top female race 14 is apertured at 29 to slidably receive the spindle 2 and is provided with a concave conical face 30 to receive and mate with the cone face 25 on the top cone bearing 10 which is identical with that shown on the lower cone bearing 12. Both the top and bottom female races are provided with flanges, such as 33 and 35, between which the hub of the bearing may be clamped, as will appear hereinafter. Top male race 9 is apertured at 36 to frictionally engage the spindle 2 and has a conical face 37 identical with that shown as 21 on bottom male race 7. Conical face 37 in turn mates with an internal conical face 39 in the top cone bearing 10.

Around the aperture 36 at the upper side of the top male race 9 is a beveled seat 40 contoured to receive the ring-shaped seal 17 of nylon which has a wedge-shaped cross section and apertured to closely fit the threads 4 on the spindle 2. Nut 18 and washer 19 engage and clamp the seal 17 and the kit parts together in assembled relation. Washer 19 is knurled on both faces to prevent relative rotation between spindle 2, seal 17, and male race 9.

Details of the several parts of the kit will be more apparent from a consideration of FIGS. 2–7 which illustrate these parts on an enlarged scale. FIGS. 3 and 4 are top and bottom perspective views of the bottom male race 7. According to these views, the male race 7 is apertured at 20 and has a surrounding flange 23 at its lower side. The upper face 42 of the flange 23 is flat and extends inwardly to a shallow channel 22 which separates the cone-shaped face 21 from the flat radial face 42. The bottom radial face of the flange 23 is also flat and knurled, as shown in FIG. 3, and terminates at its inner edge surrounding the aperture 20 in a shallow bevel 44 which is similar to, and of, the same diameter as the beveled seat 40 in the upper male race 9. The purpose of the bevel 40 is to receive a seal, such as seal 17, if that is desired, which would be forced against the shallow bevel 44 by the collar 3.

The upper, or top, male race 9 differs from the lower only in the detailed respects illustrated in FIG. 2. As will be seen from inspection of FIG. 2, top male race 9 is tapped to threadedly receive a grease fitting 45 which in turn communicates with a lubricant hole 46 terminating in a shallow channel 48 extending circumferentially about the wall of the aperture 36. From the channel 48 are several axially extending channels 49, 50, etc., which extend to the opposite edge of the aperture 36.

Figure 5:
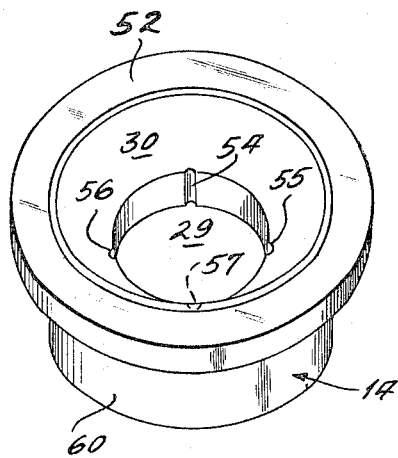
FIG. 5 is a perspective view of one side of both female races used in the kit.

Both female race members are identical and so a description of one will serve for both. Turning now to FIG. 5, the top female race 14 has a shallow cylindrical wall 52 surrounding the tapered and beveled bearing surface 30. Around the wall of the aperture 29 through the race 14 are a plurality of axially extending shallow grooves 54, 55, 56 and 57. It will be understood that the construction of the race 16 is identical in these respects and also in the respect that both have a bushing part 60 which is cylindrical and adapted to seat within a hollow hub as will appear hereinafter.

Both the top and bottom cone bearings 10 and 12 are identical and both will be described using the same reference characters, it being understood that what is stated about one of the cone bearings applies to the other as well. FIG. 6 shows a bottom side of a cone bearing, such as 10 or 12. Each bearing has a surrounding rim 62, and the upper and lower faces of this rim 62 have circumferentially extending beads 64 and 65 made of the same material as the plastic bearing. In the external cone face 25 of the bearing are a plurality of shallow grooves, such as 66, 67, 68 and 69. These grooves extend radially and axially across the face of the external cone bearing 25 from the outer periphery of the upper edge surrounding the aperture 24 to shoulder 70 at the outer periphery of the surface 25.

The internal cone face 39 extends from aperture 24 to a radial face 77 on which the rib 65 is formed. Shallow grooves, such as 80, 81, 83, etc., in the face 39 provide for lubrication.

Figure 8:
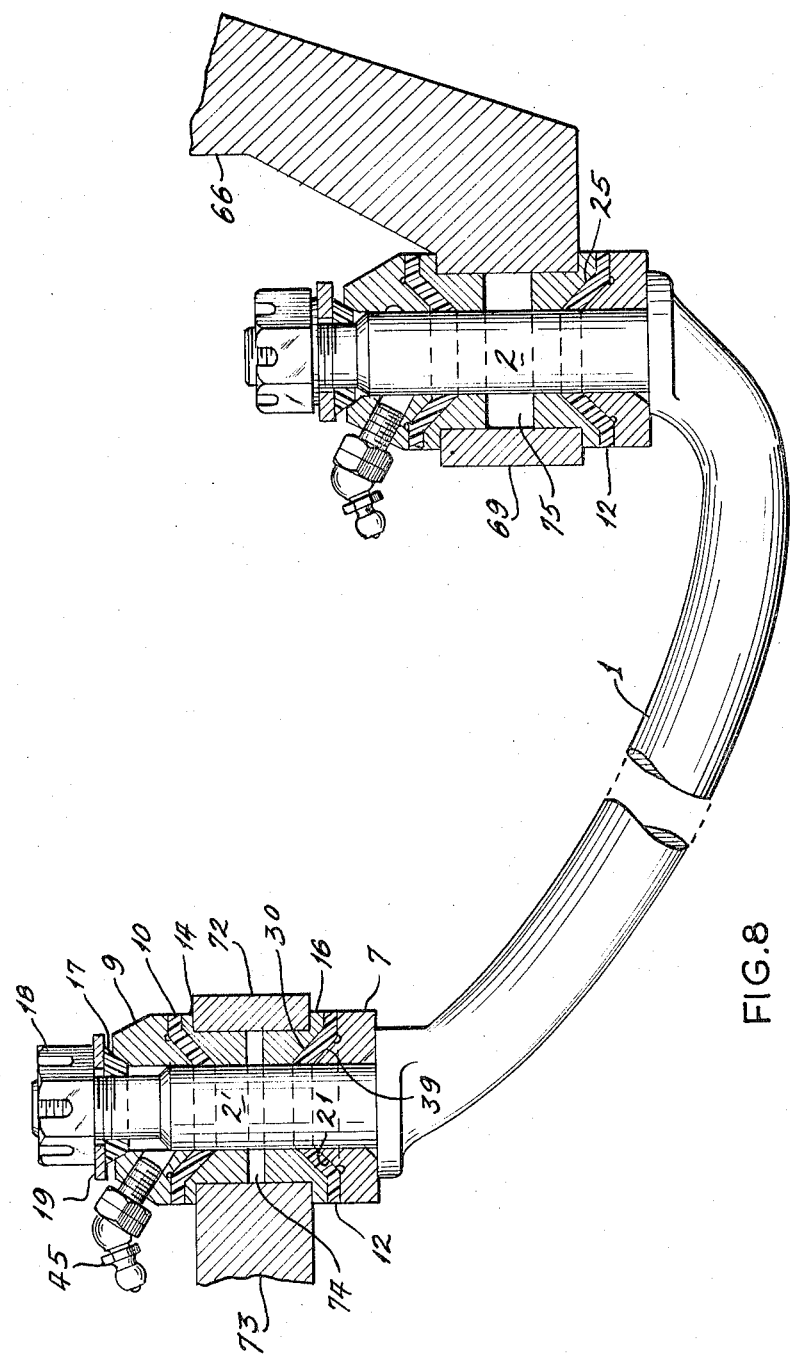
FIG. 8 is an assembly view with parts in section to illustrate the installation of the kit on both spindles of an idler arm.

In FIG. 8, the idler arm 1 is shown with two parallel spaced spindles 2 and 2'. Hollow hub 69 on the bracket 66 surrounds spindle 2. Hollow hub 72 on the link 73 surrounds spindle 2'. Each spindle is journaled in its respective hub by a separate duplicate kit of bearing parts, such as heretofore described in detail. In this particular case, the spindles are the same diameter, but different lengths, and hubs of the same diameter, but different lengths. As a result, the grease chamber 74 is smaller than 75 and the location of the top male race 9 on the spindle 2' is slightly higher than on the spindle 2. These differences, however, merely illustrate the adaptability of the kit parts. The operation in each installation is the same, the manner of installation on both spindles is the same, and a description of one will serve to explain both.

During assembly, top and bottom female races 14 and 16 are pressed into the top and bottom of hub 69. The male race is slipped over the spindle 2 onto its seat on collar 3. Preferably, the size of the hole 20 is such as to have a friction fit on spindle 2. Bottom cone bearing 12 is placed on the bottom male race 7 so that a surface, such as 39, is mated with a surface, such as 21. Spindle 2 is then inserted into the hub 69 to position surface 25 of the cone bearing 12 on surface 30 of race 16. Upper cone bearing 10 is placed over the protruding end of spindle 2 and upper male race 9 on the cone bearing. Seal 17 is then compressed under castle nut 18 and washer 19 by tightening nut 18 on threads 4. A cotter pin prevents nut 18 from backing off from adjusted position. During compression of seal 17, the material in the seal is extruded into the threads and against seat 40 and seals any clearance between the spindle 2 and aperture 36. Circumferential ribs 64 and 65 are crushed between the radial faces, such as 42 and 52, on each male and female race to seal any clearance between the cone bearings and the male and female races. The bearing is fully sealed and can be packed with grease through fitting 45. The grease entering this fitting 45 emerges through hole 46 and channels 48 and 50 to fill chambers 74, or 75, as the case may be, through channels 54–57 through hole 46 and channels 48 and 50 to fill chambers causes the grease to flow through similar channels in female race 16 and grooves 66–69 and 80–83 in bottom cone bearing 12 and similar channels in the top cone bearing 10 to fully lubricate the cone bearing surfaces, such as 25 and 39, which slidably engage cone surfaces 21 and 30 in the male and female bearing races.

When both bearings are assembled on spindles 2 and 2', the link 73 is swingably connected with the idler arm 1, and the idler arm 1 swingably connected with the bracket 66 so that oscillation between the idler arm 1 and the bracket 66 rotates the spindle 2 within the hub 69 on the top and bottom cone bearings. Likewise, link 73 is swingably connected for oscillation on spindle 2' by top and bottom cone bearings. Both bearings will remain sealed because of the natural recovery characteristics of the plastic substance, such as nylon which is used in the cone bearings and the sealing ring 17. Seal 17 and ribs, such as 62 and 66, on the cone bearings always tend to expand or recover after being compressed, so that, if some slight wear takes place, these seals remain effective to prevent the entrance of water and dirt to the bearings, or the escape of grease to the outside. This recovery characteristic remains even if the bearings are over tightened originally or later adjusted for wear.

Changes in and modifications of this construction may be made without departing from the spirit of my invention or sacrificing its advantages.

Having thus described the invention, what is claimed and desired to be secured by Letters Patent is:

1. In a sealed type of radial and thrust bearing for journaling a spindle within a hollow hub, the improvement comprising, a spindle, a hollow hub,
   (a) a pair of spindle bushings held in spaced relation on said spindle each having a flat radial face at its outer periphery,
   (b) a pair of hub bushings in spaced relation in opposite ends of said hollow hub to form a lubricant chamber between said hub bushings and with the internal wall of said hollow hub, and each having a flat radial face at its outer periphery facing a flat radial face on spindle bushing,
   (c) conical shell type bearings of nylon located between a spindle bushing and a hub bushing, and each having a flat round rim portion between a flat radial face on a spindle bushing and a flat radial face on a hub bushing, each having a continuous circular bead on each side of the rim portion, and each having a plurality of spaced lubricant grooves extending generally axially along at least one conical surface thereof,
   (d) mating male and female conical races on opposite faces of said spindle bushings and said hub bushings, each male and female race on a spindle bushing and hub bushing being spaced by a said conical shell type bearing of nylon located around said spindle and between a male and a female bushing,
   (e) a shoulder on said spindle on which one spindle bushing rests and inter-engaging threaded means on the end of said spindle spaced from said shoulder for exerting a variable pressure on the other of said spindle bushings to move said spindle bushings toward one another and hold all of said races snugly on said conical shell type bearings for supporting the spindle for rotation in said hub,
   (f) a concave seat formed in one of said spindle bushings around said spindle adjacent said threaded means,
   (g) a nylon ring on said concave seat expanded into the threads of said threaded means to effect a seal between said spindle and said spindle bushing,
   (h) annular and axially extending connected passages internally in some of said bushings opening into said chamber and into said grooves in said conical shell type bearings extending outwardly to said rim portion, and
   (i) a grease fitting in one of said bushings communicating with said annular passage,
said grooves in said shell type bearings being closed by compression of said circular beads between said flat radial faces at the outer periphery of said bushings.

2. In a bearing replacement kit for installation on an idler arm spindle with a threaded end and a collar spaced from the threaded end, said kit forming a combined radial and thrust bearing with non-metallic bearing surfaces for mounting said spindle in the sleeve of a member to connect said arm for oscillating movement with respect to said member, the improvement comprising,
   (a) an apertured male bearing race adapted to receive a spindle and having a projecting cone-like bearing surface concentric with said aperture and a radial bearing face concentric with said cone-like bearing surface,
   (b) an apertured female bearing race adapted to receive a spindle, said race having a hollow cone-like bearing surface concentric with said aperture and with said projecting cone-like bearing surface, and a radial bearing face concentric with said hollow cone-like bearing surface and with said radial bearing face on said male bearing race,
   (c) a centrally apertured cone bearing of non-metallic material having opposed male and female cone-like bearing surfaces on its opposite sides concentric with said centrally apertured cone bearings and with said cone-like bearing surfaces on said male and female bearing races and a rim concentric with said central apertured cone bearing and with said radial bearing faces on said male and female bearing races, said cone bearing acting to space said cone-like bearing surfaces on said male and female races and providing a combined radial and thrust bearing therebetween, and spacing said radial bearing faces on said male and female races from metal to metal contact, said rim being of a thickness to seal the space between said radial bearing faces, and,
   (d) means for holding said male and female races and said rim in sealing relation.

3. A kit as defined in claim 2 in which said rim has parallel opposite faces provided with circumferentially extending resilient beads held flattened by said radial bearing faces on said male and female races and in which said cone bearing and beads are nylon and made to recover when distorted from original shape.

4. In a bearing replacement kit for installation on an idler arm spindle with a threaded end and a collar spaced from the threaded end, said kit forming a combined radial and thrust bearing with non-metallic bearing surfaces for mounting said spindle in the sleeve of a member to connect said arm for oscillating movement with respect to said member, the improvement comprising,
   (a) a pair of apertured male bearing races adapted to receive a spindle and having projecting cone-like bearing surfaces concentric with said aperture and radial bearing faces concentric with said cone-like bearing surfaces,
   (b) a pair of apertured female bearing races for opposite ends of a sleeve, said races adapted to receive a spindle and having hollow cone-like bearing surfaces concentric with said aperture and with said projecting cone-like bearing surfaces of said male bearing races and radial bearing faces concentric with said hollow cone-like bearing surfaces and with said radial bearing faces on said male bearing races,
   (c) a pair of centrally apertured cone bearings of non-metallic material having opposed male and female cone-like bearing surfaces on opposite sides concentric with said centrally apertured cone bearings and with said cone-like bearing surfaces on said male and female bearing races, and rims concentric with said centrally apertured cone bearings and with said radial bearing faces on said male and female bearing races, said cone bearings acting to space said cone-like bearing surfaces on pairs of male and female races and providing combined radial and thrust bearings therebetween, and to space said radial bearing faces on pairs of said male and female races from metal to metal contact, said rims being of a thickness to seal the spaces between said pairs of radial bearing faces, and (d) means for holding said male and female races and said rims in sealing relation.

5. A kit as defined in claim 4 in which said rims have parallel opposite faces provided with circumferentially extending resilient beads held flattened by said radial bearing faces on said male and female races and in which said cone bearings and beads are of nylon and made to recover when distorted from original shape.

References Cited by the Examiner
UNITED STATES PATENTS

| | | | |
|---|---|---|---|
| 2,560,133 | 7/1951 | Schroeter | 308—238 |
| 2,914,038 | 11/1959 | McKeller | 308—36.1 X |
| 3,009,747 | 11/1961 | Pitzer | 308—71 |
| 3,039,786 | 6/1962 | Punches | 280—95 |
| 3,089,718 | 5/1963 | Gottschald et al. | |
| 3,111,334 | 11/1963 | Krizman | 287—93 X |
| 3,112,123 | 11/1963 | True | 308—238 X |

EDGAR W. GEOGHEGAN, *Primary Examiner.*

DAVID J. WILLIAMOWSKY, *Examiner.*

R. F. HESS, *Assistant Examiner.*